United States Patent
High et al.

(10) Patent No.: US 10,372,753 B2
(45) Date of Patent: Aug. 6, 2019

(54) SYSTEM FOR VERIFYING PHYSICAL OBJECT ABSENCES FROM ASSIGNED REGIONS USING VIDEO ANALYTICS

(71) Applicant: Walmart Apollo, LLC, Bentonville, AR (US)

(72) Inventors: Donald High, Noel, MO (US); Matthew Allen Jones, Bentonville, AR (US); Todd Davenport Mattingly, Bentonville, AR (US); Chandrashekar Natarajan, San Ramon, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 4 days.

(21) Appl. No.: 15/459,451

(22) Filed: Mar. 15, 2017

(65) Prior Publication Data
US 2017/0270360 A1  Sep. 21, 2017

Related U.S. Application Data

(60) Provisional application No. 62/309,057, filed on Mar. 16, 2016.

(51) Int. Cl.
*G06K 9/00* (2006.01)
*G06F 16/583* (2019.01)
*H04N 1/32* (2006.01)

(52) U.S. Cl.
CPC ..... *G06F 16/5854* (2019.01); *G06K 9/00771* (2013.01); *H04N 1/32117* (2013.01); *G06K 2209/27* (2013.01); *H04N 2201/3253* (2013.01)

(58) Field of Classification Search
None
See application file for complete search history.

(56) References Cited

U.S. PATENT DOCUMENTS

| | | | |
|---|---|---|---|
| 8,189,855 B2 | 5/2012 | Opalach et al. | |
| 8,429,004 B2 | 4/2013 | Hamilton et al. | |
| 8,438,084 B1* | 5/2013 | Tesler | G06Q 10/087 705/29 |
| 8,908,927 B2 | 12/2014 | Atsmon et al. | |
| 10,169,660 B1* | 1/2019 | Ren | G06K 9/00771 |
| 2002/0138336 A1 | 9/2002 | Bakes et al. | |

(Continued)

OTHER PUBLICATIONS

Satapathy, Rakesh, Srikanth Prahlad, and Vijay Kaulgud. "Smart Shelfie—Internet of Shelves: for Higher On-Shelf Availability.", 2015 IEEE Region 10 Symposium. IEEE, 2015. (Year: 2015).*

(Continued)

*Primary Examiner* — Vu Le
*Assistant Examiner* — Tracy Mangialaschi
(74) *Attorney, Agent, or Firm* — McCarter & English, LLP

(57) ABSTRACT

Described in detail herein are systems and methods for verification of a report of absence of a physical object from an assigned region. A mobile device may capture an image of a vacant region and transmit the image and GPS coordinates of the location of the vacant region to a video analysis module within a computing device. The video analysis module may perform video analytics on the image and verify the location of the vacant region. The video analysis module may verify the physical object is absent from the vacant region. In response to verification that the physical object is absent from the vacant region the video analysis module may trigger an event.

17 Claims, 4 Drawing Sheets

(56) References Cited

U.S. PATENT DOCUMENTS

| | | | |
|---|---|---|---|
| 2008/0077511 A1* | 3/2008 | Zimmerman | G06Q 10/00 |
| | | | 705/28 |
| 2010/0046842 A1 | 2/2010 | Conwell | |
| 2010/0057586 A1 | 3/2010 | Chow | |
| 2013/0039543 A1* | 2/2013 | Fuhr | G06Q 10/087 |
| | | | 382/103 |
| 2013/0138461 A1 | 5/2013 | Shahraray et al. | |
| 2013/0182114 A1* | 7/2013 | Zhang | H04N 7/18 |
| | | | 348/150 |
| 2014/0184818 A1* | 7/2014 | Argue | G06Q 10/087 |
| | | | 348/207.1 |
| 2014/0214547 A1 | 7/2014 | Signorelli et al. | |
| 2014/0278850 A1 | 9/2014 | Boccuzzi, Jr. et al. | |
| 2014/0313330 A1 | 10/2014 | Carey | |
| 2015/0117788 A1* | 4/2015 | Patel | G06K 9/4604 |
| | | | 382/199 |
| 2015/0262116 A1* | 9/2015 | Katircioglu | G06Q 10/087 |
| | | | 705/28 |
| 2015/0294333 A1 | 10/2015 | Avegliano et al. | |
| 2015/0379366 A1 | 12/2015 | Nomura et al. | |
| 2016/0171336 A1 | 6/2016 | Schwartz | |
| 2016/0255969 A1 | 9/2016 | High et al. | |

OTHER PUBLICATIONS

International Search Report and Written Opinion issued in related international patent application serial No. PCT/US2017/022571 dated Jul. 17, 2017.

[SHELFIE ] Reward for what's [not[ in-store, "What's happening in-st", http://takeashelfie.com/?ref=producthunt last viewed Jan. 14, 2016.

\* cited by examiner

SYSTEM FOR VERIFYING PHYSICAL OBJECT ABSENCES FROM ASSIGNED REGIONS USING VIDEO ANALYTICS

CROSS-REFERENCE TO RELATED PATENT APPLICATIONS

This application claims priority to U.S. Provisional Application No. 62/309,057 filed on Mar. 16, 2016, the content of which is hereby incorporated by reference in its entirety.

BRIEF SUMMARY

Determining and verifying that physical objects are absent from assigned locations in large facilities may be a slow and difficult process. Embodiments of the present invention perform video analytics on received images of purportedly vacant regions in a facility to speed up the process of verifying object absences from their assigned locations. Described in detail herein are systems and methods for verification of a report of an absence of a physical object from its assigned region. Video analytics may be performed on an image of a vacant region captured by a mobile device that is transmitted to a video analysis module on a computing device. GPS coordinates of the location of the vacant region may accompany the image. The video analysis module may perform video analytics on the image and verify the location of the vacant region. The video analysis module may then verify/confirm that the physical object is actually absent from the vacant region. In response to verification that the physical object is absent from the vacant region the video analysis module may trigger an event.

In one embodiment a detection system includes a computing device equipped with a processor and a video analysis module. The system may include a database accessible by the video analysis module. The video analysis module may be configured to receive a first image of a vacant region to which a first group of like physical objects are assigned. The first image may be received from a mobile device and include an identifier of the first group of like physical objects. The video analysis module may also receive, from the mobile device, GPS coordinates of a geographic location at which the first image was taken and query the database for data associated with the first group of like physical objects using the identifier of the first group of like physical objects from the first image. The video analysis module may further perform video analytics on the first image of the vacant region using data received in response to the query, verify a location of the vacant region based on the video analytics and the GPS coordinates and verify the first group of like physical objects are absent from the vacant region in the image based on the data associated with the first group of like physical objects and the location of the vacant region. In response to verifying that the first group of like physical objects are absent from the vacant region, the video analytics module may trigger an event.

In another embodiment, a detection method includes receiving, with a computing device equipped with a video analysis module, a first image of a vacant region to which a first group of like physical objects are assigned, the first image received from a mobile device and including an identifier of the first group of like physical objects. The method also includes receiving, from the mobile device, GPS coordinates of a geographic location at which the first image was taken and analyzing the first image with the video analysis module. The video analysis module queries the database for data associated with the first group of like physical objects using the identifier of the first group of like physical objects from the first image. The video analysis module also performs video analytics on the first image of the vacant region using data received in response to the query, verifies a location of the vacant region based on the video analytics and the GPS coordinates, and verifies the first group of like physical objects are absent from the vacant region in the image based on the data associated with the first group of like physical objects and the location of the vacant region. An event is triggered in response to verifying that the first group of like physical objects are absent from the vacant region.

BRIEF DESCRIPTION OF DRAWINGS

Illustrative embodiments are shown by way of example in the accompanying drawings and should not be considered as a limitation of the present disclosure. The accompanying drawings, which are incorporated in and constitute a part of this specification, illustrate one or more embodiments of the invention and, together with the description, help to explain the invention. In the drawings.

DETAILED DESCRIPTION

Figure 1:
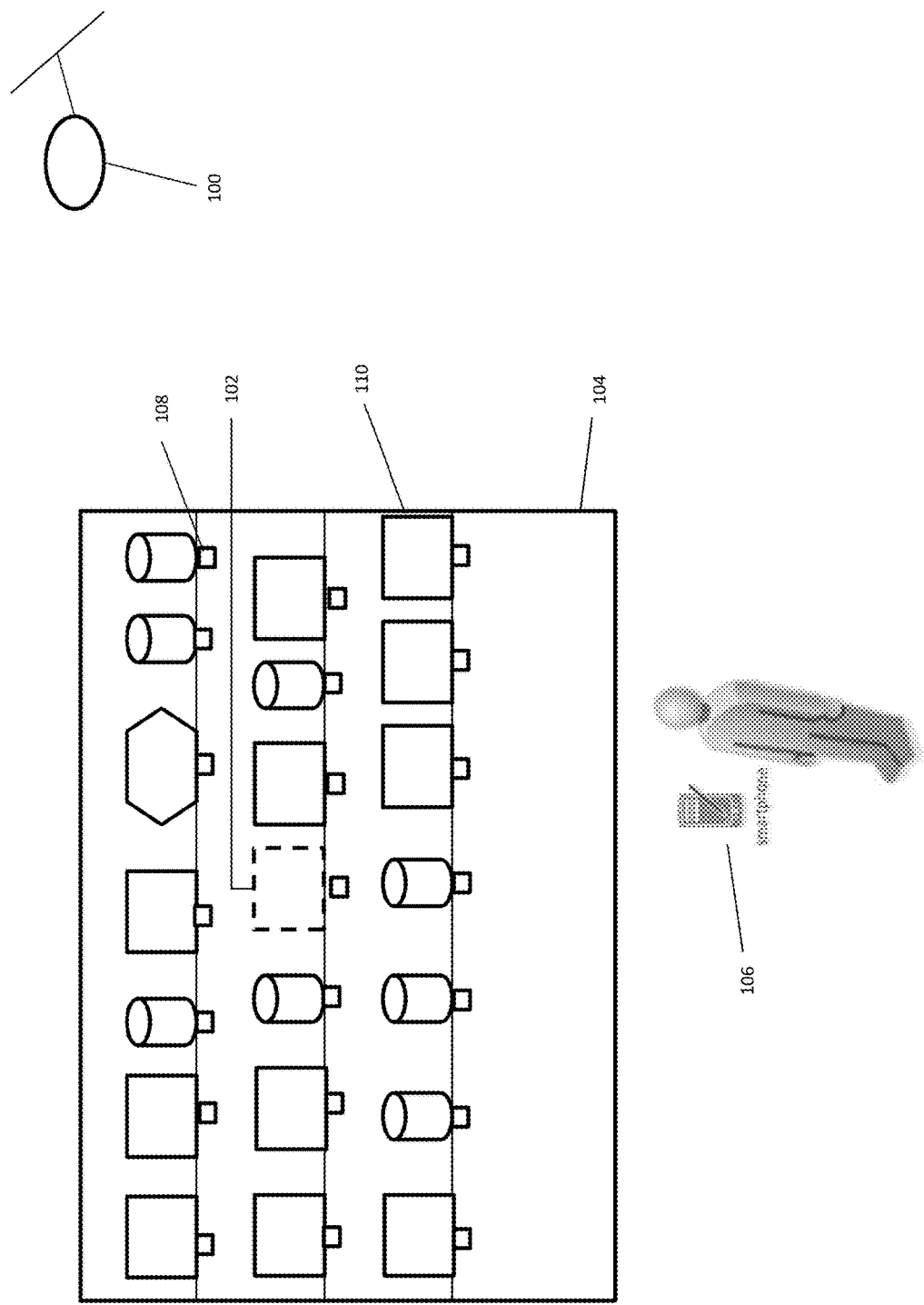
FIG. 1 is a block diagram illustrating mobile devices and storage unit for physical objects within an exemplary facility.

Embodiments of the present invention perform video analytics on images purporting to show vacant regions in a facility when the region should be filled with objects. FIG. 1 is a block diagram illustrating mobile devices and an exemplary storage unit for physical objects within the facility. In exemplary embodiments, a computing device (not shown in FIG. 1) is equipped with a processor and a video analysis module (not shown in FIG. 1). A database may be accessible by the video analysis module. The video analysis module may be configured to receive an image of a vacant region 102 to which a first group of like physical objects are assigned. The first group of like physical objects may be assigned in a storage unit 104. The storage unit 104 may be a shelf, dump bin, wire rack, or pegboard. The first group of like physical objects may be surrounded by a second group of physical objects 108 different than the first group of like physical objects. Each of the first and second group of physical objects assigned on the storage unit 104 includes an identifier 108. In exemplary embodiments, the identifier may be an optical machine readable representation such as a bar code or QR code. The mobile device 106 may capture an image of the vacant region 102 and the corresponding identifier 108 and transmit the image of the vacant region 102, and GPS coordinates of the geographic location at which the image of the vacant region 102 was taken, to the video analysis module. For example, the mobile device may be a user's phone and the user may take a picture of an empty shelf where the user expected to find a particular product displayed. The mobile device 106 may be an Internet appliance, a hand-held device, a wireless device, a portable device, a wearable computer, a cellular or mobile phone, a portable digital assistants (PDAs), a smart phone, a tablets, an ultrabook, a netbook, a laptop, or some other electronic device equipped with an image capturing capability and a communication capability sufficient to forward a captured image to the video analysis module for analysis. The mobile device 106 may transmit the image without solicitation from the video analysis module (i.e. without first being prompted).

The video analysis module may receive, an unsolicited image of the vacant region 102, the corresponding identifier 108 and GPS coordinates of a geographic location at which the image of the vacant region 102 was taken. The video analysis module may extract the identifier 108 from the image and query the database for data associated with the first group of like physical objects using the identifier 108 of the first group of like physical objects from the image. In exemplary embodiments, the data associated with the first group of like physical objects includes at least one of a name, quantity, shape, size, dimensions and image of at least one of the first group of like physical objects. The video analysis module may further perform video analytics on the first image of the vacant region using data received in response to the query and verify a location of the vacant region based on the video analytics. For example, the video analysis module may compare the image retrieved from the database with the first image. In another example, the video analysis module may retrieve the location at which the first group of like physical objects are supposed to be located using the identifier to find the assigned region for the physical objects listed in the database and to then compare the retrieved location to the received GPS coordinates of a geographic location at which the image of the vacant region 102 was taken.

In another embodiment, an image capture device 100 may be affixed to a fixture in the facility. The image capture device 100 may capture an image of the mobile device 106 capturing the first image of the vacant region 102. A confirmation module within the computing device, may be configured to confirm that the image taken by the mobile device of the vacant region 102 is legitimate by comparing the image captured by the image capturing device 100 that is affixed to the facility with the image of the vacant region 102 taken by the mobile device 106. The video analysis module is further configured to verify the geographic location by performing video analytics on the image captured by the image capture device 100 affixed to a fixture in the facility to determine a second group of physical objects 110 adjacent to the vacant region 102. For example, the video analysis module may determine the designated location of the second group of physical objects 110 surrounding the first group of like physical objects. The video analysis module may verify the location of the vacant region 102 by comparing the retrieved designated location of the second group of physical objects 110 with the received GPS coordinates indicating the location at which the image of the vacant region 102 was taken (by the mobile device).

In some embodiments, the image of the vacant region 102 may not include the identifier 108. The video analysis module may determine the location of the first group of physical objects by performing video analytics on the image captured by the image capture device 100 and determining the second group of physical objects 110 surrounding the vacant region 102. For example, the second group of objects may be identified by image comparison with stored images in the database and the assigned location of the second group of objects.

In some embodiments, the mobile device 106 may not transmit the GPS coordinates indicating the location at which the image of the vacant region 102 was taken. The video analysis module may determine the location of the first group of physical objects by performing video analytics on the image captured by the image capture device 100 and determining the second group of physical objects 110 surrounding the vacant region 102. For example, the second group of objects may be identified by image comparison with stored images in the database and the assigned location of the second group of objects.

The video analysis module may verify that the first group of like physical objects are absent from the vacant region 102 in the image based on the data associated with the first group of like physical objects and the location of the vacant region 102. The video analysis module is configured to verify that the first group of like physical objects are absent from the vacant region 102 by comparing at least one of the size, shape, and dimensions of the vacant region to at least one of the size, shape and dimensions of the at least one of the first group of like physical objects. For example, the video analysis module may extract the size and dimensions of the vacant region 102 from the image and compare the size and dimensions of the vacant region 102 to the size and dimensions of the first group of like physical objects. The video analysis module may determine the vacant region is lacks space to store the first group of like products and consequently, the first group of physical objects may not be absent from the vacant region 102. In another embodiment, the video analysis module may verify the first group of like physical objects are absent from the vacant region 102 by retrieving the quantity of physical objects designated to be at the vacation region 102. For example, the video analysis module may retrieve the quantity of the first group of the like physical objects designated to be disposed in the vacant region 102. The video analysis module may determine the combined dimensions of the quantity of the first group of the like physical objects is greater than the size of the vacant region 102, consequently, video analysis module may determine the first group of like physical objects is not to be absent from the vacant region 102 since it could not fit in the vacant region. Otherwise the video analysis module may verify that the first group of like physical objects is absent from the vacant region 102. In response to verifying that the first group of like physical objects are absent from the vacant region 102 the video analytics module may trigger an event. In exemplary embodiments, the event may be issuing an alert regarding the absence of the first group of objects from the vacant region and storing a record of a user reporting the absent physical object of the mobile device 106. In another embodiments, the event may be automatically replenishing the first group of like physical objects.

The described system may be implemented as a retail store verification system, verifying a customer report of a possible out-of-stock product in a retail store. In exemplary embodiments, the first group of like physical objects may be a possible out-of-stock product. A customer using their mobile device 106 may launch an application associated with the retail store. The retail store may include a storage unit 104 such as shelves, dump bins, wire racks and pegboards. The storage unit 104 may include products for sale at the retail store. Each product may have a corresponding identifier 108 listed on the storage unit 104 and or the individual product. The identifier may be an optical machine readable representation such as a barcode or QR code. The storage unit 104 may include a vacant region 102. The application may prompt the customer to capture an image of the vacant region 102 including the corresponding identifier 108, at which a possible out-of-stock product is assigned. For example, the vacant region 102 may be a location to which a certain type of cereal may be assigned. Using the application the customer may transmit the image of the vacant region 102 including the corresponding identifier 108 and GPS coordinates at which the image of the vacant region 102 was taken to the video analysis module. The video analysis module may extract the identifier from the image and query the database for data associated with the possible out-of-stock product assigned to the vacant region 102. In exemplary embodiments, the data associated with the product includes at least one of a name, quantity, shape, size, dimensions and image. For example, the data can include the name of the cereal, brand of cereal, type of cereal, quantity of cereal in stock, designated location of the cereal, dimensions of the box of cereal, size of the box of cereal and an image of the box of cereal.

The video analysis module may further perform video analytics on the image of the vacant region 102 using data received in response to the query and verify a location of the vacant region based on the video analytics. For example, the video analysis may retrieve the location at which the possible out-of-stock product is supposed to be located using the identifier and compare the retrieved location to the received GPS coordinates of a geographic location at which the image of the vacant region 102 was taken.

In another embodiment, the image capture device 100 may be affixed to a fixture in the facility. The image capture device 100 may capture an image of the mobile device 106 capturing an image of the vacant region 102. A confirmation module within the computing device, may be configured to confirm that the image taken by the mobile device of the vacant region 102 is legitimate by comparing the image captured by the image capturing device 100 and the image of the vacant region 102. In one embodiment, times of the respective images may also be confirmed. In other words the video analysis module can use the image capture device 100 to confirm that the first image was taken at the location, and optionally time, that was claimed. The video analysis module is further configured to verify the geographic location by performing video analytics on the image captured by the image capturing device 100 affixed to a fixture in the facility and determining a second group of physical objects 110 adjacent to the vacant region 102. The second group of physical objects 110 may be different products also located on the storage unit 104. For example, the video analysis module may determine the second group of physical objects 110 surrounding the vacant region 102, and query the database for the designated location of the different products surrounding the vacant region 102. The video analysis module may verify the location of the vacant region 102 by comparing the determined designated location of the second group of physical objects 110 with the GPS coordinates indicating the location at which the image of the vacant region 102 was taken.

The video analysis module may verify that the possible out-of-stock product is in fact out of stock. For example, the video analysis module may determine the quantity of a certain type of cereal designated to be located at the vacant region 102. Furthermore, the video analysis module may extract the size and dimensions of the vacant region 102 and compare the size and dimensions of the vacant region 102 to the size and dimensions of the box of cereal. For example, the size and dimensions of the vacant region 102 may be smaller than the size and dimensions of the quantity of boxes of cereal assigned to the region and consequently it may be physically impossible for the cereal box to be able to fit in the vacant region 102. Therefore, the video analysis module may determine cereal is not absent from the vacant region 102. Otherwise the video analysis module may verify that the cereal is absent from the vacant region 102.

In response to determining the product is out of stock the video analysis module may trigger an event. The event may be alerting an employee that there is an out of stock product, and providing an incentive to the customer for reporting the out-of-stock product. The incentive may be a coupon, a discount or a financial reward. In another embodiment, the event may trigger a replenishment process for the out-of-stock product.

Figure 2:
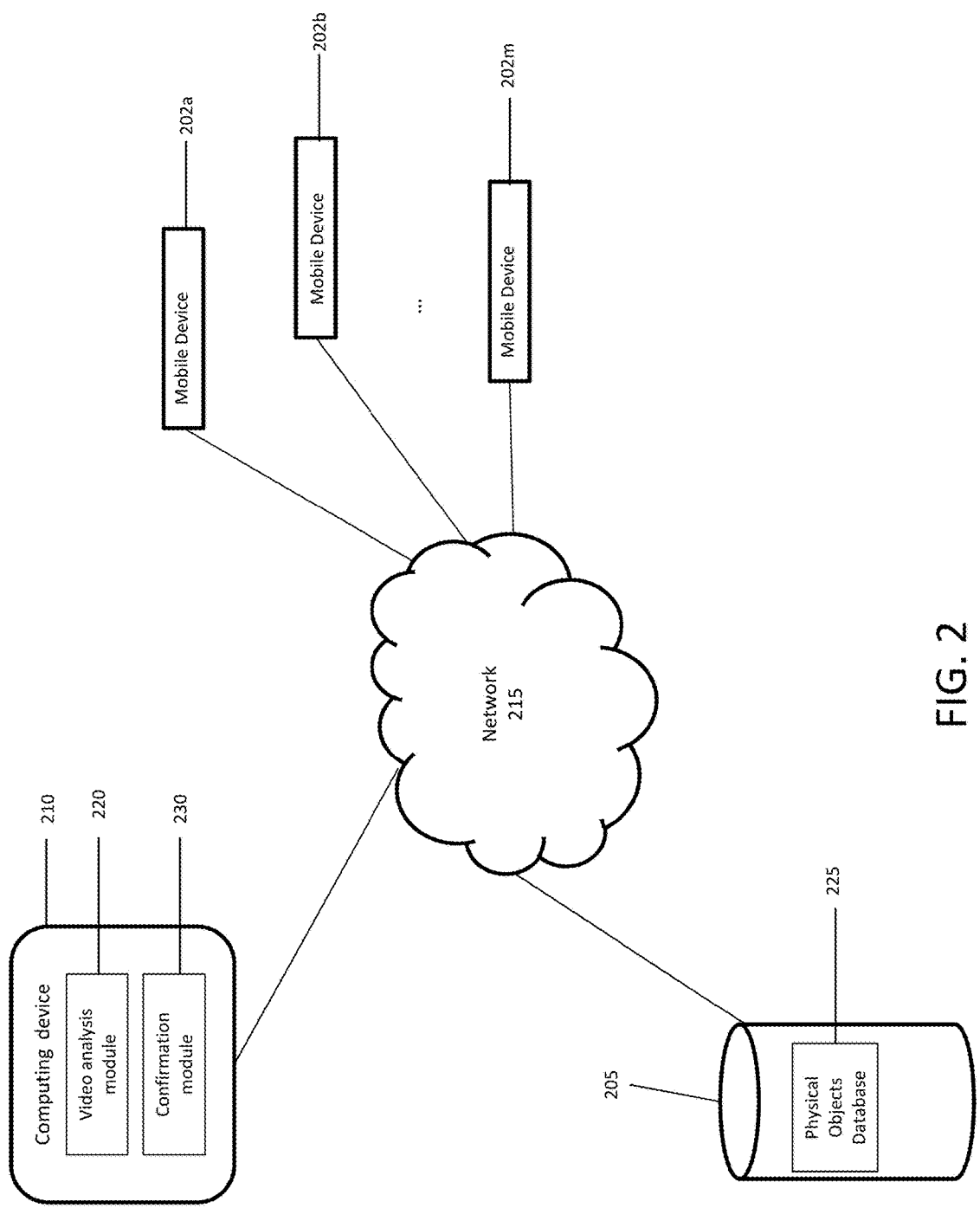
FIG. 2 illustrates an exemplary environment for a verification system in accordance with exemplary embodiments of the present invention.

FIG. 2 illustrates an exemplary network environment for a verification system in accordance with exemplary embodiments of the present invention. In exemplary embodiments, the network environment includes a group of mobile devices 202a-m connected to a computing device 210 via a network 215. The computing device 210 may be connected to a database 205 via network 215. The computing system 210 may include applications or computer-executable processes such as a video analysis module 220 and a confirmation module 230. The database 205 may include the physical objects database 225. The physical objects database 225 may store data including but not limited to: a name of a physical object, a quantity of a physical object, a shape of a physical object, a size of a physical object, dimensions of physical objects and images of physical objects.

In an example embodiment, one or more portions of network 205 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The group of mobile devices 202a-m, the computing system 210 and the database 205 may be connected to the network 215 via a wired or wireless connection.

The mobile devices 220a-m may include, but are not limited to, Internet appliances, hand-held devices, wireless devices, portable devices, wearable computers, cellular or mobile phones, portable digital assistants (PDAs), smart-phones, tablets, ultrabooks, netbooks, laptops, multi-processor systems, microprocessor-based or programmable consumer electronics, and the like.

In exemplary embodiments, a computing device 210 is equipped with a processor and a video analysis module 220. A database 205 including the physical objects database 225 may be accessible by the video analysis module 220 via the network 215. The video analysis module 220 may be configured to receive an image of a vacant region 102 (as shown in FIG. 1) to which a first group of like physical objects are assigned. The first group of like physical objects may be surrounded by a second group of physical objects 110 (as shown in FIG. 1) different than the first group of like physical objects. Each of the physical objects are designated by an identifier 108 (as shown in FIG. 1). In exemplary embodiments, the identifier 108 may be an optical machine readable representation such as a bar code or QR code. At least one of the group mobile devices 202a-m (for example, 202b) may capture an image of the vacant region 102 (as shown in FIG. 1) and the corresponding identifier 108 and transmit the image of the vacant region 102 and GPS coordinates of the geographic location at which the image of the vacant region 102 was taken, via the network 215 to the video analysis module 220. The mobile device 202b may transmit the image, without solicitation from the video analysis module 220.

The video analysis module 220 may receive, an unsolicited image of the vacant region 102, the corresponding identifier 108 and GPS coordinates of a geographic location at which the image of the vacant region 102 was taken. The video analysis module 220 may extract the identifier 108 from the image and query the physical objects database 225 for data associated with the first group of like physical objects using the identifier 108 of the first group of like physical objects from the image. In exemplary embodiments, the data associated with the first group of like physical objects includes at least one of a name, quantity, shape, size, dimensions and image of at least one of the first group of like physical objects. The video analysis module 220 may further perform video analytics on the first image of the vacant region 102 using data received in response to the query and verify a location of the vacant region 102 based on the video analytics. For example, the video analysis module 220 may retrieve the location at which the first group of like physical objects are supposed to be located using the identifier 108 and compare the retrieved location to the received GPS coordinates of a geographic location at which the image of the vacant region 102 was taken.

In another embodiment, an image capture device 100 (as shown in FIG. 1) may be affixed to a fixture in the facility. The image capture device 100 may capture an image of the mobile device 202b capturing an image of the vacant region 102. A confirmation module 230 within the computing device 210, may be configured to confirm that the image taken by the mobile device 202b of the vacant region 102 is legitimate by comparing the image captured by the image capturing device 100 and the image of the vacant region 102 taken by the user's mobile device. In one embodiment, the video analysis module may also analyze images taken by the image capturing device immediately before the user's image of the vacant region 102 in order to verify that the user did not create the vacant region. The video analysis module 220 is further configured to verify the geographic location by performing video analytics on the image captured by the image capturing device 100 affixed to a fixture in the facility and determining the second group of objects 110 adjacent to the vacant region 102. The video analysis module 220 may be able to determine temporal and spatial events in the image. For example, the video analysis module 220 may determine the designated location of the second group of physical objects 110 surrounding first group of like physical object. The video analysis module 220 may verify the location of the vacant region 102 by comparing the retrieved designated location of the second group of physical objects 110 with the received GPS coordinates indicating the location at which the image of the vacant region 102 was taken.

In some embodiments, the image of the vacant region 102 may not include the identifier 108. The video analysis module 220 may determine the location of the first group of like physical objects by performing video analytics on the image captured by the image capture device 100 and determining the second group of physical objects 110 surrounding the vacant region 102.

In some embodiments, the mobile device 106 may not transmit the GPS coordinates indicating the location at which the image of the vacant region 102 was taken. The video analysis module 220 may determine the location of the first group of like physical objects by performing video analytics on the image captured by the image capture device 100 and determining the second group of physical objects 110 surrounding the vacant region 102.

Upon verification of the location of the vacant region 102, the video analysis module 220 may verify that the first group of like physical objects are absent from the vacant region 102 in the image based on the data associated with the first group of like physical objects and the location of the vacant region 102. The video analysis module 220 is configured to verify that the first group of like physical objects are absent from the vacant region 102 by comparing at least one of the size, shape, and dimensions of the vacant region 102 to at least one of the size, shape and dimensions of the at least one of the first group of like physical objects. For example, the video analysis module 220 may extract the size and dimensions of the vacant region 102 from the image and compare the size and dimensions of the vacant region 102 to the size and dimensions of the first group of like physical objects. For example, the size of the vacant region 102 may be smaller than the size of the first group of like physical objects. Consequently, the video analysis module 220 may determine the first group of physical objects may not fit in the vacant region 102 and thus, is not absent. In another embodiment, the video analysis module 220 may verify that the first group of like physical objects are absent from the vacant region 102 by retrieving the quantity of the first group of like physical objects designated to be at the vacant region 102. In response to verifying that the first group of like physical objects are absent from the vacant region 102, the video analytics module 220 may trigger an event. In exemplary embodiments, the event may be issuing an alert regarding the absence of the first group of like physical objects from the vacant region and storing a record of a user reporting the absence from the mobile device 202b.

Figure 3:
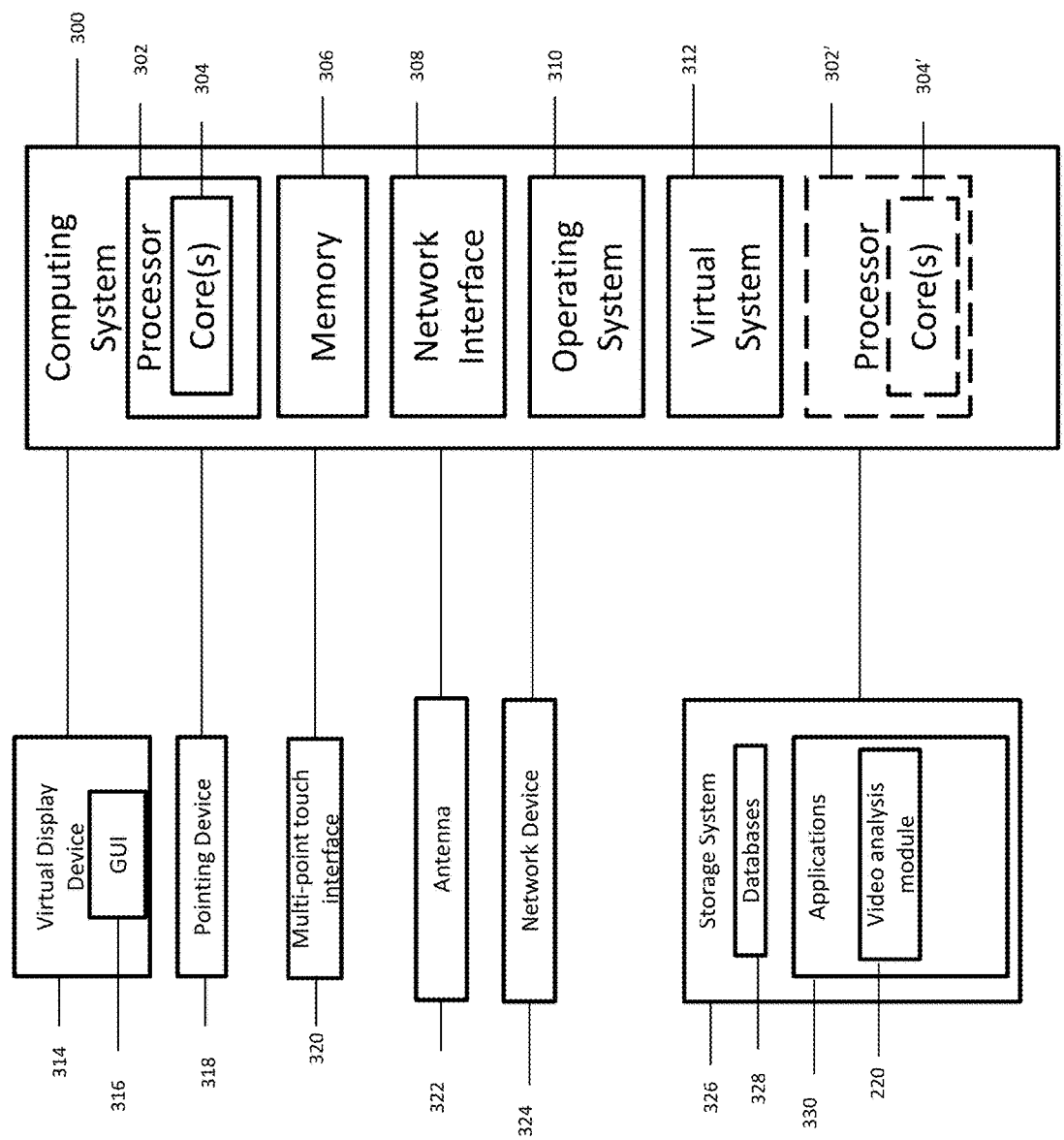
FIG. 3 is a block diagram of an example computing system for implementing exemplary embodiments of the present invention.

FIG. 3 is a block diagram of an example computing device for implementing exemplary embodiments of the present invention. In exemplary embodiments, the computing system 300 may implement embodiments of computing device 210 or the mobile device 202a-m. The computing system 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing system 300 may store computer-readable and computer-executable instructions or software (e.g., applications 330) for implementing exemplary operations of the computing system 300. The computing system 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 210.

Virtualization may be employed in the computing system 300 so that infrastructure and resources in the computing system 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing system 300 through a visual display device 314, such as a computer monitor, which may display one or more graphical user interfaces 316, multi touch interface 320, and a pointing device 318.

The computing system 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding the physical objects. The databases 328 may be updated manually or automatically at any suitable time to add, delete, and/or update one or more data items in the databases.

The computing system 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing system 300 and a network and/or between the computing system 300 and other computing devices. The network interface 308 may include a built-in network adapter, network interface card, PCMCIA network card, card bus network adapter, wireless network adapter, USB network adapter, modem or any other device suitable for interfacing the computing system 300 to any type of network capable of communication and performing the operations described herein.

The computing system 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing system 300 and performing the operations described herein. In exemplary embodiments, the operating system 310 may be run in native mode or emulated mode. In an exemplary embodiment, the operating system 310 may be run on one or more cloud machine instances.

Figure 4:
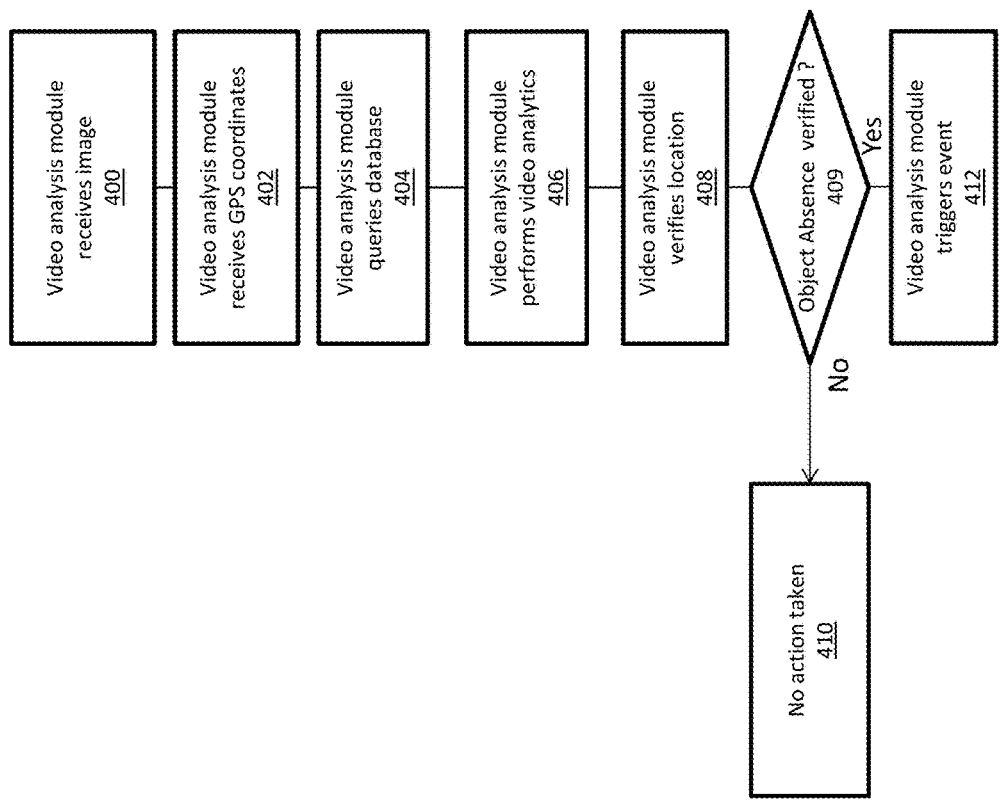
FIG. 4 is a flowchart illustrating an exemplary process for a tracking system in accordance with exemplary embodiments of the present invention.

FIG. 4 is a flowchart illustrating an exemplary process for a verification system accordance with exemplary embodiments of the present disclosure. In exemplary embodiments, in operation 400 the video analysis module 220 (as shown in FIG. 2) may receive a first image of a vacant region 102 (as shown in FIG. 1) to which a first group of like physical objects are assigned. The first image may be captured from at least one of a group of mobile devices 202a-m (as shown in FIG. 2, for example 202b). The first image includes the vacant region 102 and including an identifier 108 of the first group of like physical objects. The first group of like physical objects may be assigned in a storage unit 104 (as shown in FIG. 1). The storage unit 104 may be a shelf, dump bin, wire rack, or pegboard. The first group of like physical objects may be surrounded by a second group of physical objects 108 (as shown in FIG. 1) different than the first group of like physical objects. Each of the first and second group of physical objects assigned on the storage unit 104 includes an identifier 108. In exemplary embodiments, the identifier may be an optical machine readable representation such as a bar code or QR code.

In operation 402, the video analysis module 220 may further receive GPS coordinates of a geographic location at which the first image was taken, from the mobile device 202b. In operation 404, the video analysis module 220 may query the physical objects database 225 (as shown in FIG. 2) for data associated with the first group of like physical objects using the identifier 108 of the first group of like physical objects from the first image. In exemplary embodiments, the video analysis module 220 may extract the identifier 108 from the image and query the physical objects database 225 for data associated with the first group of like physical objects using the identifier 108 of the first group of like physical objects from the image. In exemplary embodiments, the data associated with the first group of like physical objects includes at least one of a name, quantity, shape, size, dimensions and image of at least one of the first group of like physical objects.

In operation 406, the video analysis module 220 may perform video analytics on the first image of the vacant region 102 using data received in response to the query. The video analysis module may determine temporal and spatial events within the image.

In operation 408, the video analysis module 220 may verify a location of the vacant region 102 based on the video analytics. For example, the video analysis module 220 may retrieve the location to which the first group of physical objects are assigned using the identifier 108 and comparing the retrieved location to the received GPS coordinates of a geographic location at which the image of the vacant region 102 was taken. In another embodiment, an image capture device 100 (as shown in FIG. 1) may be affixed to a fixture in the facility. The image capture device 100 may capture an image of the mobile device 202b capturing an image of the vacant region 102. A confirmation module 230 within the computing device 210, may be configured to confirm that the image taken by the mobile device 202b of the vacant region 102 is legitimate by comparing the image captured by the image capturing device 100 and the image of the vacant region 102. The video analysis module 220 is further configured to verify the geographic location by performing video analytics on the image captured by the image capturing device 100 affixed to a fixture in the facility and determining the second group of physical objects 110 adjacent to the vacant region 102. The video analysis module 220 may be able to determine temporal and spatial events in the image. For example, the video analysis module 220 may determine the designated location of the second group of physical objects 110 surrounding first group of physical objects. The video analysis module 220 may verify the location of the vacant region 102 by comparing the retrieved designated location of the other physical objects 110 with the received GPS coordinates indicating the location at which the image of the vacant region 102 was taken.

In operation 409, following verification of the location of the vacant region 102, the video analysis module 220 may attempt to verify that the first group of like physical objects are absent from the vacant region 102 in the image based on the data associated with the group of physical objects and the location of the vacant region. The video analysis module 220 is configured to verify that the first group of like physical objects are absent from the vacant region 102 by comparing at least one of the size, shape, and dimensions of the vacant region 102 to at least one of the size, shape and dimensions of the at least one of the first group of like physical objects. For example, the video analysis module 220 may extract the size and dimensions of the vacant region 102 from the image and compare the size and dimensions of the vacant region 102 to the size and dimensions of the first group of like physical objects. In another embodiment, the video analysis module 220 may verify that the first group of like physical objects are absent from the vacant region 102 by retrieving the quantity of physical objects designated to be at the vacant region 102. If the physical object absence cannot be verified (operation 409), no action is taken in operation 410.

However, if in operation 409 the object absence is verified, in operation 412, an event is triggered in response to verifying that the first group of like physical objects are absent from the vacant region. In exemplary embodiments, the event may be issuing an alert regarding the absence of the first group of objects from the vacant region and storing a record of a user reporting the absent of the mobile device 202b.

Exemplary Embodiments

In exemplary embodiments, an image capture device may be affixed to a fixture of a facility and the computing device may be further equipped with a confirmation module. The confirmation module may be configured to confirm that the first image taken by the mobile device is legitimate by capturing a second image of the mobile device taking the first image of the vacant region, the second image taken by the image capturing device affixed to the fixture of the facility.

In exemplary embodiments, the location is a location within a retail facility.

In exemplary embodiments, the video analytics include determining at least one of the size, shape, and dimensions of the vacant region.

In exemplary embodiments, the data associated with the first group of like physical objects includes at least one of a shape, size, dimensions and image of at least one of the first group of like physical objects.

In exemplary embodiments, the video analysis module is configured to verify that the first group of like physical objects are absent from the vacant region by comparing at least one of the size, shape, and dimensions of the vacant region to at least one of the size, shape and dimensions of the at least one of the first group of like physical objects.

In exemplary embodiments, the video analysis module is configured to verify that the first group of like physical objects are absent from the vacant region by retrieving from the database a quantity of the first group of like physical objects.

In exemplary embodiments, the video analysis module is further configured to verify the geographic location by performing video analytics on the second image captured by the image capturing device affixed to a fixture in the facility and determining a second group of objects adjacent to the vacant region.

In exemplary embodiments, the event is issuing an alert regarding the absence of the first group of like physical objects from the vacant region and storing a record of a user of the mobile device.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

Since certain changes may be made without departing from the scope of the present invention, it is intended that all matter contained in the above description of shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A detection system comprising:
   a computing device equipped with a processor and a video analysis module and a confirmation module;
   an image capture device affixed to a fixture of a facility; and
   a database accessible by the video analysis module;
   wherein the video analysis module is configured to:
     receive a first image of a vacant region to which a first plurality of like physical objects are assigned, the first image received from a mobile device executing an application associated with the facility and including an identifier of the first plurality of like physical objects,
     receive, from the mobile device, GPS coordinates of a geographic location at which the first image was taken;
     query the database for data associated with the first plurality of like physical objects using the identifier of the first plurality of like physical objects from the first image;
     perform video analytics on the first image of the vacant region using data received in response to the query;
     verify a location of the vacant region based on the video analytics and the GPS coordinates;
     retrieve a stored image of at least one of the first plurality of like physical objects, from the database;
     compare the stored image of the at least one of the first plurality of like physical objects with the first image of the vacant region;
     verify the first plurality of like physical objects are absent from the vacant region in the image based on the data associated with the first plurality of like physical objects and the location of the vacant region and the comparison of the stored image of the at least one of the first plurality of like physical objects with the first image of the vacant region, wherein, in response to verifying that the first plurality of like physical objects are absent from the vacant region, an event is triggered, wherein the confirmation module is configured to confirm that the first image taken by the mobile device is legitimate by capturing a second image of the mobile device taking the first image of the vacant region, the second image taken by the image capturing device affixed to the fixture of the facility.

2. The system of claim 1, wherein the location is a location within a retail facility.

3. The system of claim 1, wherein the video analytics include determining at least one of the size, shape, and dimensions of the vacant region.

4. The system of claim 1, wherein the data associated with the first plurality of like physical objects includes at least one of a shape, size, dimensions and image of at least one of the first plurality of like physical objects.

5. The system of claim 4, wherein the video analysis module is configured to verify that the first plurality of like physical objects are absent from the vacant region by comparing at least one of the size, shape, and dimensions of the vacant region to at least one of the size, shape and dimensions of the at least one of the first plurality of like physical objects.

6. The system of claim 4, wherein the video analysis module is configured to verify that the first plurality of like physical objects are absent from the vacant region by retrieving from the database a quantity of the first plurality of like physical objects.

7. The system of claim 1, wherein the video analysis module is further configured to verify the geographic location by performing video analytics on the second image captured by the image capturing device affixed to a fixture in the facility and determining a second plurality of objects adjacent to the vacant region.

8. The system of claim 1, wherein the event is issuing an alert regarding the absence of the first plurality of like physical objects from the vacant region and storing a record of a user of the mobile device.

9. A detection method comprising:
receiving, with a computing device equipped with a video analysis module and a confirmation module, in communication with a database, a first image of a vacant region within a facility, to which a first plurality of like physical objects are assigned, the first image received from a mobile device executing an application associated with the facility and including an identifier of the first plurality of like physical objects;
receiving, from the mobile device, GPS coordinates of a geographic location at which the first image was taken; and
analyzing the first image with the video analysis module, the video analysis module:
querying the database for data associated with the first plurality of like physical objects using the identifier of the first plurality of like physical objects from the first image,
performing video analytics on the first image of the vacant region using data received in response to the query,
verifying a location of the vacant region based on the video analytics and the GPS coordinates,
retrieving a stored image of at least one of the first plurality of like physical objects, from the database;
comparing the stored image of the at least one of the first plurality of like physical objects with the first image of the vacant region;
verifying the first plurality of like physical objects are absent from the vacant region in the image based on the data associated with the first plurality of like physical objects and the location of the vacant region and the comparison of the stored image of the at least one of the first plurality of like physical objects with the first image of the vacant region; and
confirming, with the confirmation module that the first image taken by the mobile device is legitimate by capturing a second image of the mobile device taking the first image of the vacant region, the second image taken by an image capturing device affixed to a fixture of the facility,
wherein an event is triggered in response to verifying that the first plurality of like physical objects are absent from the vacant region.

10. The method of claim 9, wherein the geographic location is a geographic location within a retail facility.

11. The method of claim 9, wherein performing the video analytics comprises determining, via the computing device, at least one of the size, shape, and dimensions of the vacant region.

12. The method of claim 9, wherein the data associated with the first plurality of like physical objects includes at least one of a shape, size, dimensions and image of at least one of the first plurality of like physical objects.

13. The method of claim 12, wherein verifying that the first plurality of like physical objects are absent from the vacant region further includes comparing, at least one of the size, shape, and dimensions of the vacant region to at least one of the size, shape and dimensions of the at least one of the first plurality of like physical objects.

14. The method of claim 12, wherein verifying the first plurality of like physical objects are absent from the vacant region further comprising retrieving, from the database a quantity of first plurality of like physical objects.

15. The method of claim 9, wherein verifying the geographic location further includes performing, with the video analysis module, video analytics on the second image captured by the image capturing device affixed to a fixture in the facility and determining a second plurality of objects adjacent to the vacant region.

16. The method of claim 9, wherein the event is an issued alert regarding the absence of the first plurality of like physical objects from the vacant region and a storing of a user of the image capturing device.

17. One or more non-transitory computer readable memory media storing instructions, wherein the instructions are executable by one or more processors to:
receive, with a computing device equipped with a video analysis module and a confirmation module and in communication with a database, a first image of a vacant region within a facility, to which a first plurality of like physical objects are assigned, the first image received from a mobile device executing an application associated with the facility and including an identifier of the first plurality of like physical objects;
receive, from the mobile device, GPS coordinates of a geographic location at which the first image was taken; and
analyze the first image with the video analysis module, the video analysis module configured to:

query the database for data associated with the first plurality of like physical objects using the identifier of the first plurality of like physical objects from the first image,
perform video analytics on the first image of the vacant region using data received in response to the query,
verify a location of the vacant region based on the video analytics and the GPS coordinates,
retrieve a stored image of at least one of the first plurality of like physical objects, from the database;
compare the stored image of the at least one of the first plurality of like physical objects with the first image of the vacant region;
verify the first plurality of like physical objects are absent from the vacant region in the image based on the data associated with the first plurality of like physical objects and the location of the vacant region and the comparison of the stored image of the at least one of the first plurality of like physical objects with the first image of the vacant region; and
confirm, with the confirmation module that the first image taken by the mobile device is legitimate by capturing a second image of the mobile device taking the first image of the vacant region, the second image taken by an image capturing device affixed to a fixture of the facility, wherein an event is triggered in response to verifying that the first plurality of like physical objects are absent from the vacant region.

\* \* \* \* \*